*(12)* United States Patent
Tayyab

(10) Patent No.: US 12,287,395 B2
(45) Date of Patent: Apr. 29, 2025

(54) RIS-BASED ENHANCED POSITIONING

(71) Applicant: Nokia Solutions and Networks Oy, Espoo (FI)

(72) Inventor: Muhammad Tayyab, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/659,723

(22) Filed: May 9, 2024

(65) Prior Publication Data

US 2024/0402328 A1  Dec. 5, 2024

(30) Foreign Application Priority Data

May 30, 2023  (FI) ...................................... 20235599

(51) Int. Cl.
*G01S 13/76*  (2006.01)
*G01S 5/02*  (2010.01)

(52) U.S. Cl.
CPC .......... *G01S 13/765* (2013.01); *G01S 5/0273* (2013.01)

(58) Field of Classification Search
CPC ..... G01S 5/0273; G01S 13/765; H04W 64/00
See application file for complete search history.

(56) References Cited

U.S. PATENT DOCUMENTS

| | | | |
|---|---|---|---|
| 2020/0127784 A1 | 4/2020 | Akkarakaran et al. | |
| 2022/0038139 A1 | 2/2022 | Lowenmark et al. | |
| 2023/0176174 A1* | 6/2023 | Penna | G01S 5/02521 342/451 |
| 2024/0031980 A1* | 1/2024 | Duan | H04W 68/00 |

(Continued)

FOREIGN PATENT DOCUMENTS

| | | |
|---|---|---|
| CN | 111245494 A | 6/2020 |
| CN | 115412187 A | 11/2022 |
| EP | 4143596 A1 | 3/2023 |

(Continued)

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

(Continued)

*Primary Examiner* — Cassi J Galt
(74) *Attorney, Agent, or Firm* — Nokia Technologies Oy

(57) ABSTRACT

A base station selects, in response to a location request for a UE, RIS(s) to use for positioning purposes for the UE. The base station performs a process with the selected RISs to determine information used to configure the UE with RS configuration for using the selected RIS(s) for the positioning purposes. The base station sends the RS configuration to the UE. An RIS receives signals including RSs to be used for positioning purposes for a UE. The RIS time stamps the signals with the RSs and reflects signals including the RSs and corresponding time stamps. A UE receives a reference signal configuration for using RIS(s), receives RSs based on the configuration, and receives signals comprising RSs that have been reflected from the RIS(s). The UE performs timing estimates based on the received signals and sends indication of the timing estimates toward the base station.

12 Claims, 10 Drawing Sheets

(56) References Cited

U.S. PATENT DOCUMENTS

2024/0056129 A1\* 2/2024 Duan ................... H04L 5/0051

FOREIGN PATENT DOCUMENTS

| WO | 2020/190607 A2 | 9/2020 |
| WO | 2021/221603 A1 | 11/2021 |
| WO | 2022/133957 A1 | 6/2022 |
| WO | 2022/133958 A1 | 6/2022 |
| WO | 2022/169728 A1 | 8/2022 |
| WO | 2022/187773 A1 | 9/2022 |
| WO | 2022/197369 A2 | 9/2022 |
| WO | 2022/197378 A1 | 9/2022 |
| WO | 2022/199785 A1 | 9/2022 |
| WO | 2022/261576 A1 | 12/2022 |
| WO | 2023/058139 A1 | 4/2023 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; NR; Physical channels and modulation (Release 17)", 3GPP TS 38.211, V17.4.0, Dec. 2022, pp. 1-136.

Wu et al., "Towards Smart and Reconfigurable Environment: Intelligent Reflecting Surface Aided Wireless Network", IEEE Communications Magazine, vol. 58, No. 01, Jan. 2020, pp. 106-112.

Wu et al., "Intelligent Reflecting Surface-Aided Wireless Communications: A Tutorial", IEEE Transactions on Communications, vol. 69, No. 05, May 2021, pp. 3313-3351.

U.S. Appl. No. 63/477,642, "Reconfigurable Intelligent Surface Assisted Communication", filed on Dec. 29, 2022, pp. 1-34.

"Ambient IoT device characteristics and targeted spectrum", 3GPP TSG-RAN #99, RP-230058, Agenda: 9.2.3, Nokia, Mar. 20-23, 2023, 4 pages.

"Ambient IoT positioning", 3GPP TSG-RAN #99, RP-230057, Agenda: 9.2.3, Nokia, Mar. 20-23, 2023, 4 pages.

Ammous et al., "Positioning and Tracking Using Reconfigurable Intelligent Surfaces and Extended Kalman Filter", IEEE 95th Vehicular Technology Conference: (VTC2022-Spring), Jun. 19-22, 2022, 6 pages.

Zhang et al., "Positioning with Dual Reconfigurable Intelligent Surfaces in Millimeter-Wave MIMO Systems 25", IEEE/CIC International Conference on Communications in China (ICCC), Aug. 9-11, 2020, pp. 800-805.

Office action received for corresponding Finnish Patent Application No. 20235599, dated Nov. 9, 2023, 9 pages.

Office action received for corresponding Finnish Patent Application No. 20235599, dated Mar. 26, 2024, 5 pages.

Extended European Search Report received for corresponding European Patent Application No. 24174317.8, dated Oct. 9, 2024, 8 pages.

\* cited by examiner

RIS-BASED ENHANCED POSITIONING

RELATED APPLICATION

This application claims benefit of priority from Finnish Patent App. No. 20235599, filed May 30, 2023, the disclosure of which is hereby incorporated in its entirety by reference herein.

TECHNICAL FIELD

Examples of embodiments herein relate generally to determining position of user equipment (UE) within a wireless network system.

BACKGROUND

Reconfigurable intelligent surfaces (RISs) are able to reflect radio frequency signals in particular directions. RISs may be used for techniques such as positioning of user equipment (UEs) in wireless systems.

BRIEF SUMMARY

This section is intended to include examples and is not intended to be limiting.

In an exemplary embodiment, a method is disclosed that includes selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

An exemplary computer program product includes a computer-readable storage medium bearing instructions that, when executed by an apparatus, cause the apparatus to perform at least the following: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

In another exemplary embodiment, an apparatus comprises means for performing: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

In an exemplary embodiment, a method is disclosed that includes receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

An exemplary computer program product includes a computer-readable storage medium bearing instructions that, when executed by an apparatus, cause the apparatus to perform at least the following: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

In another exemplary embodiment, an apparatus comprises means for performing: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

In an exemplary embodiment, a method is disclosed that includes receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

An exemplary computer program product includes a computer-readable storage medium bearing instructions that, when executed by an apparatus, cause the apparatus to perform at least the following: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

In another exemplary embodiment, an apparatus comprises means for performing: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

DETAILED DESCRIPTION OF THE DRAWINGS

Figure 1:
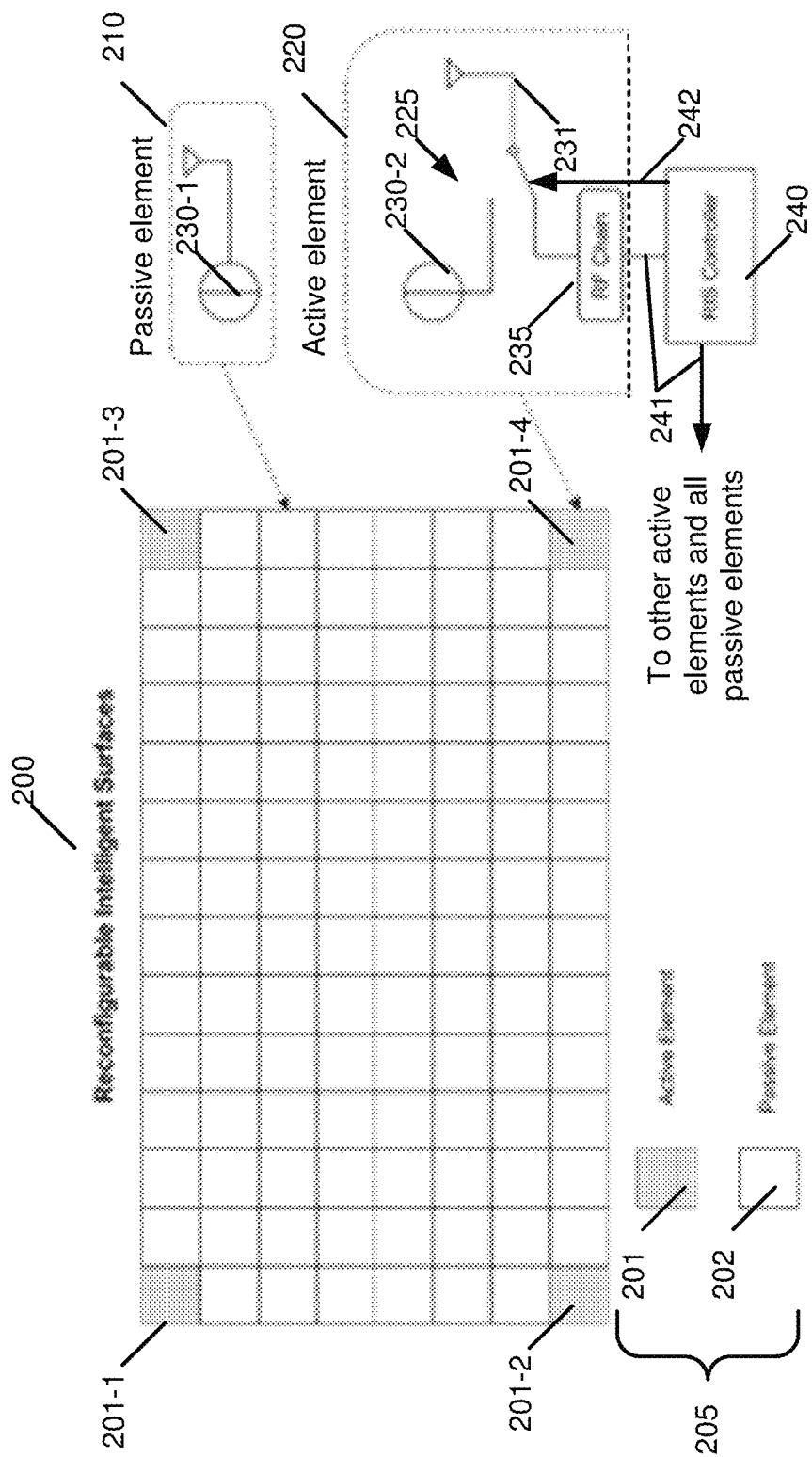
FIG. 1 illustrates an example hardware architecture of a reconfigurable intelligent surface (RIS)

When more than one drawing reference numeral, word, or acronym is used within this description with "/", and in general as used within this description, the "/" may be interpreted as "or", "and", or "both". As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Any flow diagram (see FIGS. 9 and 11) or signaling diagram (see FIGS. 8 and 10 herein) is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment. Block diagrams (such as FIGS. 11A and 11B, FIG. 7, and FIG. 8) also illustrate the operation of an exemplary method, results of execution of computer program instructions embodied on a computer readable memory, functions performed by logic implemented in hardware, and/or interconnected means for performing functions in accordance with an exemplary embodiment.

The exemplary embodiments herein describe techniques for RIS-based enhanced positioning. Additional description of these techniques is presented after a presentation of an example system into which the exemplary embodiments may be implemented is described.

There is a demand for Internet of Things (IoT) devices that provide improved coverage (e.g., 30 meters (m) indoor and up to 100 m outdoor) and accommodate increased device density with ultra-low-cost and power consumption not supported by existing solutions (e.g., RFID, radio frequency identification that has coverage up to 10 m). Ambient Internet of things, IoT (also referred to as, AIoT) devices, i.e., devices that are battery-less or devices that have batteries but do not need battery replacement over the lifetime of the device, are expected to have lower complexity, data rate, cost, and energy consumption than narrowband (NB)-IoT/enhanced machine-type communication (eMTC) devices. AIoT devices also promise increased coverage and greater localization accuracy (e.g., AIoT positioning accuracy may be 3 m for the indoor environment and 10 m for the outdoor settings). The use cases for ambient IoT devices include identification, tracking, monitoring, sensing, logistics and supply chain management, transportation, manufacturing (e.g., factory automation), healthcare, energy, agriculture, transportation, smart cities, environment, extreme conditions, and hazardous environments in some use cases (e.g., environments where devices with batteries is not an option).

Reconfigurable intelligent surfaces (RISs) are surfaces that can be used with user equipment (UEs, which are wireless, typically mobile devices) and network entities, such as base stations, e.g., for cellular networks. RISs are also known as "reconfigurable reflecting surfaces", "intelligent reflecting surface (IRS)", "large intelligent surfaces", "array of reconfigurable reflecting antenna elements", and the term "RIS" as used herein is meant to cover all of these and other similar devices. Current implementations of RIS are based on liquid crystal meta-structures, reconfigurable reflect arrays, mechanical structures, and programmable metamaterials or a combination of these.

The passive nature of the reflecting elements results in low hardware costs, low energy consumption, and the ability to naturally operate in full-duplex (FD) mode. An example RIS may be a low-profile auxiliary device that can be integrated into an existing communication network transparently, providing great flexibility and compatibility in terms of deployment.

RISs include a large number of passive and/or active reflecting elements based on RF micro-electromechanical systems (MEMS) or metamaterials, whose phase (and gains) can be dynamically configured can be configured for various purposes, such as being able to beamform to particular base stations or to a particular UE. One or more base stations can share a single RIS, and RISs can have schedules so an individual RIS shared between two base stations can be configured to beamform to each base station (or to UEs connected to individual base stations) based on the schedules.

The scatterers of a given array may be passive elements configured to scatter or reflect a signal wave without performing active processing of that signal. Additionally or alternatively, a given RIS may include one or more active elements that can perform active processing of signals. Active elements may be configured to interface with one or more passive elements of the RIS to monitor and control operation thereof. RISs are used to reflect many types of signals, including reference signals used for many different purposes in cellular networks. One example of a purpose of a reference signal is for determining a position (i.e., positioning) of a UE connected to the cellular network.

In order to obtain positioning measurement, an example positioning system may rely on a positioning reference signal (PRS) when operating in the DL (downlink) direction and rely on one or more sounding reference signals (SRSs) when operating in the UL (uplink) direction. In an example, the positioning measurements are made using one or more operations within a physical layer of the Open Systems Interconnection (OSI) model. As just one example, in the UL direction, a UE baseband modem supports the positioning measurements using SRS and, in the DL direction, the gNB baseband modem supports the positioning measurements using PRS. In order to increase the hearability, increase correlation properties, and improve the interference avoidance properties, the PRS or SRS sequences are spread over the time domain and frequency domain. To do this, various configuration parameters (e.g., comb-size, repetition factor, periodicity, bandwidth (BW) factors, and the like) for PRS/SRS are defined. For example, SRS may be designed with various configuration parameters (as given below) to improve hearability. To minimize interference, the UE can be configured with different SRS instances, each with independent power control loops. This allows SRS pointed at neighbor cells to have better hearability and keeps the interference low in the serving cell. Furthermore, for use cases with higher transmission loss (for example, in macro cell deployments) the SRS can be also configured to be repeated to improve hearability.

A typical indoor positioning system necessitates at least three base stations to perform a trilateration at the receiver node using methods like time of arrival, time difference of arrival, angle of arrival, or received signal strength-based methods. However, positioning multiple base stations to have overlapping coverage in an indoor environment may be difficult or impossible due to internal or external structural or natural elements, such as, for example, thick walls, metal window frames, ceilings, pillars, basement rooms, surrounding mountainous features or tall buildings.

The present disclosure includes example embodiments directed to asset positioning in wireless networks, such as cellular networks. The trilateration technique is one example of a technique that may be used to localize a target device based on distances between the target device and three anchors with known coordinates. The technique may necessitate all anchors and the target itself, e.g., the satellites and the mobile phone in the Global Navigation Satellite System (GNSS), respectively, to actively transmit/receive radio signals, during localization, such that the delay of the one-way radio signal propagated between each anchor and the target can be measured.

While description so far has placed emphasis on passive elements, an RIS can have reconfigurable active elements. As illustrated, for example, in FIG. 1, active elements of the RIS 200 can be connected to an RF chain by a switch 225. The RIS 200 includes a plurality of elements 205 spaced apart from one another along a surface of the RIS 200 to create an array layout. The elements 205 include active elements 201 and passive elements 202. In the example embodiment illustrated in FIG. 1, the RIS 200 includes four active elements 201, in this case elements 201-1, 201-2, 201-3, and 201-4, positioned in the corners of a rectangular array layout, and passive elements 202 are disposed relative to the active elements 201 to complete the rectangular array layout. It is noted that while four active elements 201 and 108 passive elements 202 are illustrated in FIG. 1, this is merely exemplary, and more or fewer active elements 201 and/or more or fewer passive elements 202 may be used, and the active elements 201 may be positioned in different locations from those illustrated in FIG. 1.

The passive elements 202 include circuitry 210 configured to couple the passive elements 202 to a corresponding antenna using an RF phase shifter 230-1. The active elements 201 include circuitry 220 configured to couple an RF phase shifter 230-2 or RF chain 235 to corresponding antennas, based on position of the switch 225. The active elements 220 in this example comprise a switch 225 that can switch between a first mode (not connected in this example) and a second mode (connected in this example). The first mode, when selected by switch 225, connects the RF phase shifter 230-2 to the antenna 231. The second mode, as illustrated, connects an RF chain (of circuitry) 235 to the antenna 231. The RF chain 235 is also connected to the RIS controller 240, another set of circuitry, which controls functions of the RF chain 235. The RIS controller connects via links 242 to switches 225 and connects to the active element 220, and to other active elements 220 and all passive elements via links 241. The RIS controller 240 is connected to each of the passive reconfigurable reflecting elements (referred to simply as passive elements 210) and the assistance channel sensing elements (referred to simply as active elements 220), and adjusts the corresponding RF phase shifters 230 in accordance with one or more channel estimates from the assistance channel sensing elements 220. In more detail, using outputs from the channel sensing mode, the RIS controller 240 is configured to adjust the passive reconfigurable reflecting elements 210, and operation of the assistance channel sensing elements 220 in the reflection mode. It is noted that the RF phase shifters 230 may include additional circuitry that is not shown, such as one or more filters, amplifiers, and so on. A phase shifter 230 for the active element 220 could be the same or different than a phase shifter 230 for a passive element 210. To differentiate active channel sensing elements from the passive reconfigurable reflecting elements, they can be implemented using reconfigurable active RF circuits, as one example.

The active elements 201 may be configured to communicate control messages between the RIS 200 and base station. Additionally or alternatively, the active elements 201 may be configured to provide channel sensing by measuring reference signals. As another example, the active elements 201 may be configured to control phases of the signals reflected by the passive elements 202 to cause the reflected signal to travel in a predefined desired direction.

Figure 3:
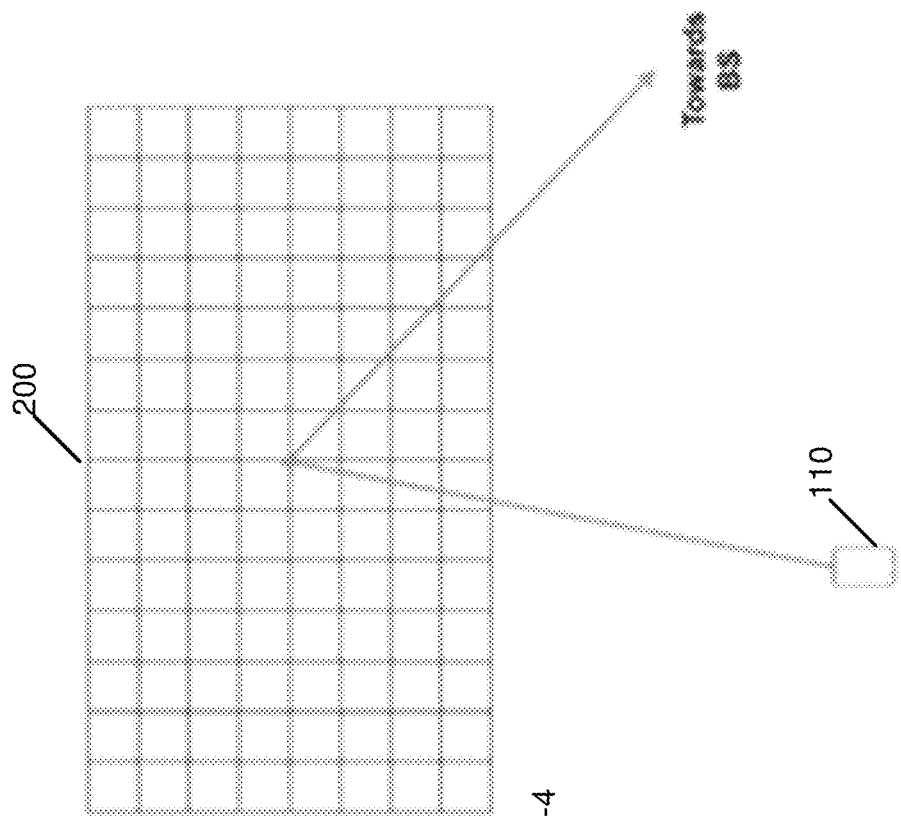
FIG. 3 illustrates RIS in a reflection mode.
Figure 2:
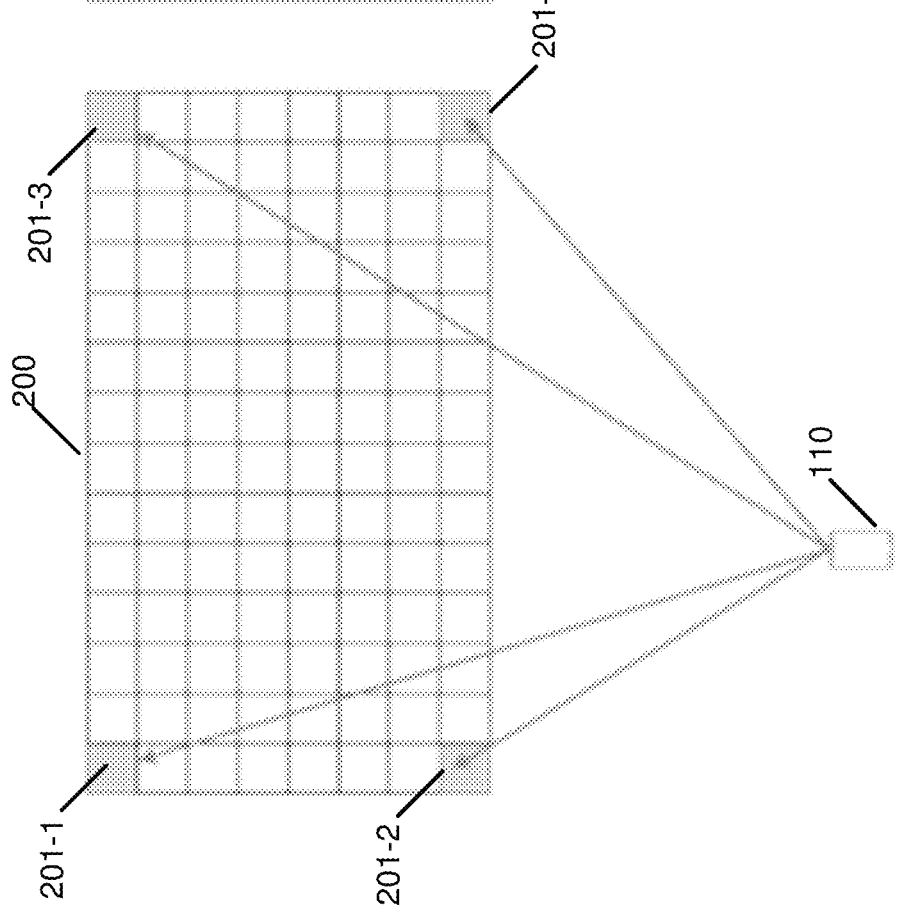
FIG. 2 illustrates RIS in a sensing mode.

As one example, the RIS 200 equipped with one or more active elements 201 may be configured to operate in at least two modes, a sensing mode and a reflection mode. In the sensing mode, as illustrated, for example, in FIG. 2, the active elements 201 of the RIS 200 are activated (e.g., via the switch 225) for channel sensing and may be configured to measure incoming reference signals sent by the device (e.g., UE 110). In the reflection mode, as illustrated, for example, in FIG. 3, the active elements 201 are deactivated (e.g., via the switch 225) and operate in a manner similar to, and together with, the passive elements 202 to optimize the reflection matrix of the RIS 200 to redirect the incoming signal (e.g., a signal traveling from the UE 110 to the base station 170 or vice versa) to prevent the signal from being blocked by an obstacle.

Figure 4:
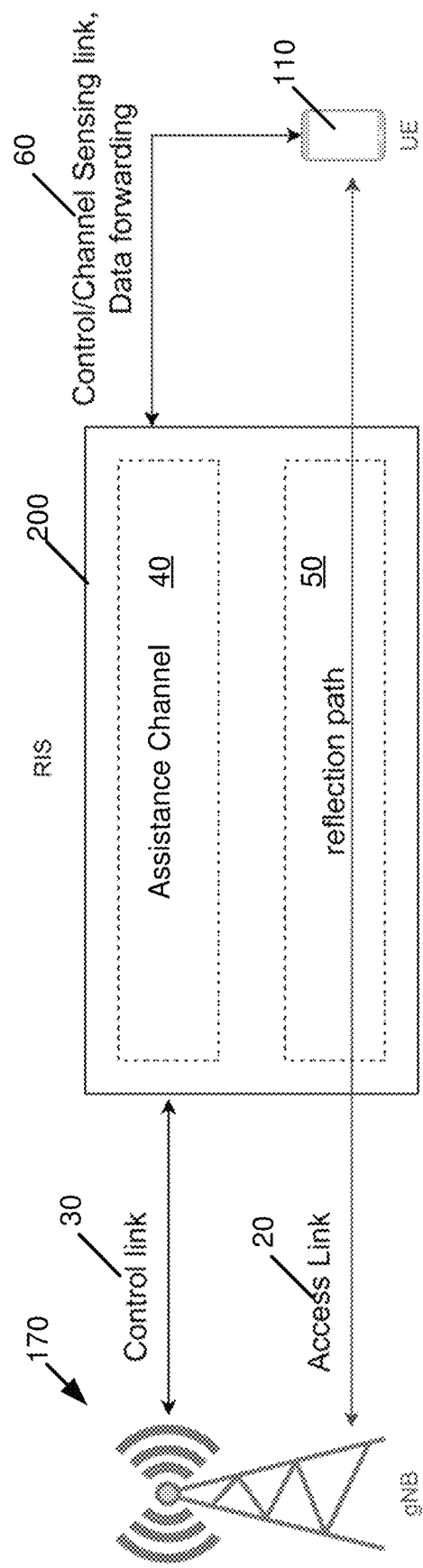
FIG. 4 illustrates an RIS having both an assistance channel and a reflection path.

Turning to FIG. 4, an RIS 200 having both an assistance channel and a reflection path is illustrated. In this example, the base station 170 has a control link 30 with the RIS 200, and the UE 110 has a control/channel sensing link 60, with data forwarding, with the RIS 200. There is an assistance channel 40, which can be used, e.g., to connect with a UE for channel sensing, and to forward reference signals sent by a UE to a base station (or from a base station to a UE). An access link 20 is also shown, and this passes through a reflection path 50 between the base station 170 and the UE 110. An RIS-gNB assistance channel is known as a gNB control channel (e.g., via control link 30) while a UE-RIS channel could be an assistance channel (AC) 40, via the channel 60. It is noted that the assistance channel 40 may also be referred to as an active channel, but the term "assistance" channel is used herein for clarity, e.g., to avoid confusion with other uses of the term "active."

Figure 5:
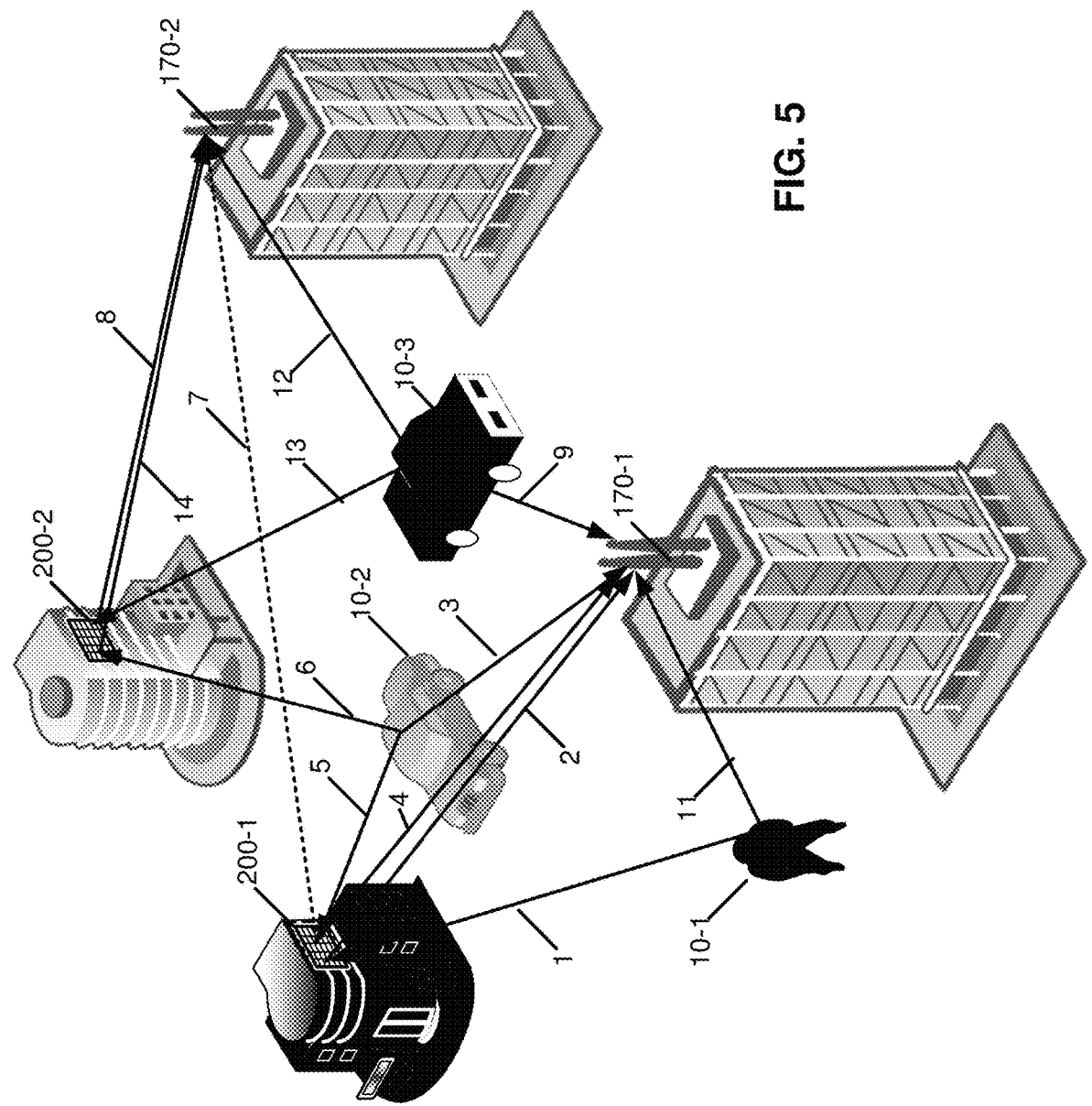
FIG. 5 illustrates an example with multiple users, multiple RISs and multiple gNBs.

FIG. 5 illustrates an example with multiple users 10-1, 10-2, and 10-3 (e.g., each using/being a UE 10 and, hereinafter, referred to also as UE 10-1, 10-2, and 10-3, respectively), multiple RISs 200-1 and 200-2, and multiple base stations 170-1 and 170-2. The UE 10-1 communicates via a direct link 11 to the base station 170-1, but a link 1 can be reflected over RIS 200-1 to the base station 170-1 via link 2. Links 1 and 2 are part of a reflection path 50 as in FIG. 4. The UE 10-2 has a direct link 3 to the base station 170-1, but also has a reflection path 50 to the base station 170-1 via link 5 and its reflected version in link 4. The UE 10-2 may also have a reflection path 50 to base station 170-2 via link 6 and a link 14 that is reflected by the RIS 200-2. The UE 10-3 has a direct link 9 to the base station 170-1, a direct link 12 to the base station 170-2, and a reflection path 50 to the base station 170-2 via the path 13 to the RIS 200-2 and the path 8 from the RIS 200-2 to the base station 170-2.

It is also possible for the RISs 200 to be configured for beamforming. That is, array elements 205 (see FIG. 1) can be configured to perform beamforming. For instance, thinking of the elements 205 as being a matrix of elements, individual elements 205 can be configured via individual phase configurations or reflection coefficients, as examples, so that signals on link 5 from user 10-2 can be beamformed as link 4 to the base station 170-1. The RIS 200-1 can be configured to beamform toward the base station 170-1 at certain times. At other times, the RIS 200-1 can be configured to beamform toward the base station 170-2 instead, such that signals received on link 5 from user 10-2 are beamformed toward the base station 170-2 on link 7. The base stations 170-1 and 170-2 may communicate to determine a schedule of beamforming, or a network element 190 may control the RISs 200 and base stations 170 to implement such a schedule. Note also that only one such beamforming example is provided for one user 10 (user 10-2 in this example), but beamforming could be implemented for signals from the other users too.

Figure 6:
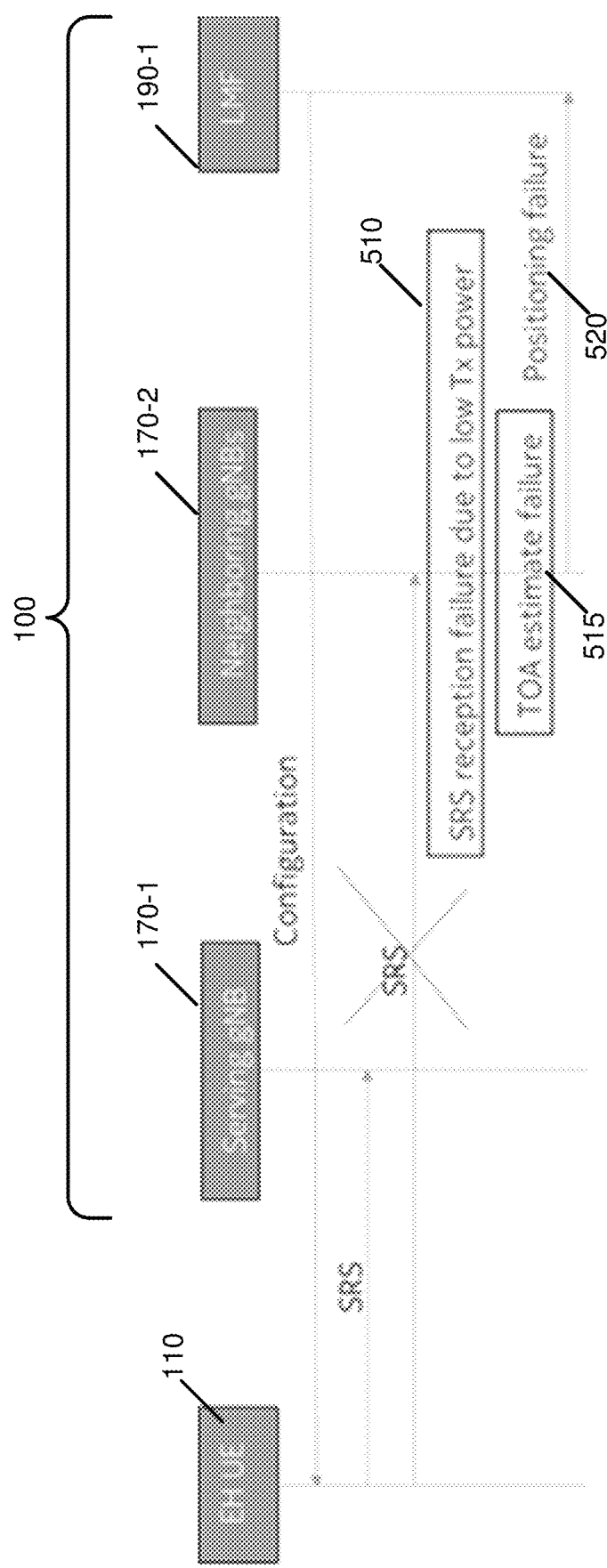
FIG. 6 illustrates a problem with positioning of energy harvesting devices connected to a cellular network.

In the example of FIG. 5, all of the UEs 10 are mobile and have relatively high power, but this may not always be the case. Consider an ambient IoT device, for instance, which is constrained in resources, i.e., low-complexity hardware, limited memory, and processing power, low storage capability, and no permanent energy source. As the ambient IoT devices have low transmit power capability, the SRS-based positioning may fail due to the high inter-site distance between the serving and the neighboring cells, especially for indoor positioning use cases. As illustrated in FIG. 6, a problem with positioning of energy harvesting devices connected to a cellular network. The EH UE 110 connects to a serving base station 170-1, and through the base station 170-1 to an LMF 190-1, and can connect to neighboring base station(s) 170-2. The LMF 190-1 can signal configuration to the EH UE 110, the EH UE 110 can signal SRS to the serving base station 170-1, but the SRS signaling is not received by the neighboring base station(s) 170-2, and this leads to a cascade of issues including SRS failure due to low transmission power in block 510, time of arrival (TOA) estimate failure in block 515, and signaling of positioning failure in signaling 520 from the neighboring base station(s) 170-2 to the LMF 190-1.

That is, all this may result in positioning failure for EH devices. Performing positioning for EH devices can be a challenge, although the examples herein are not limited to EH devices.

To address this and other issues, an enhanced positioning solution is proposed for devices such as EH devices that utilize the nearest located RIS for positioning purposes. As an example, a method is proposed to perform positioning using RIS, where the RIS acts as an anchor and helps to locate the UE(s) based on their position with respect to RIS.

Figure 7:
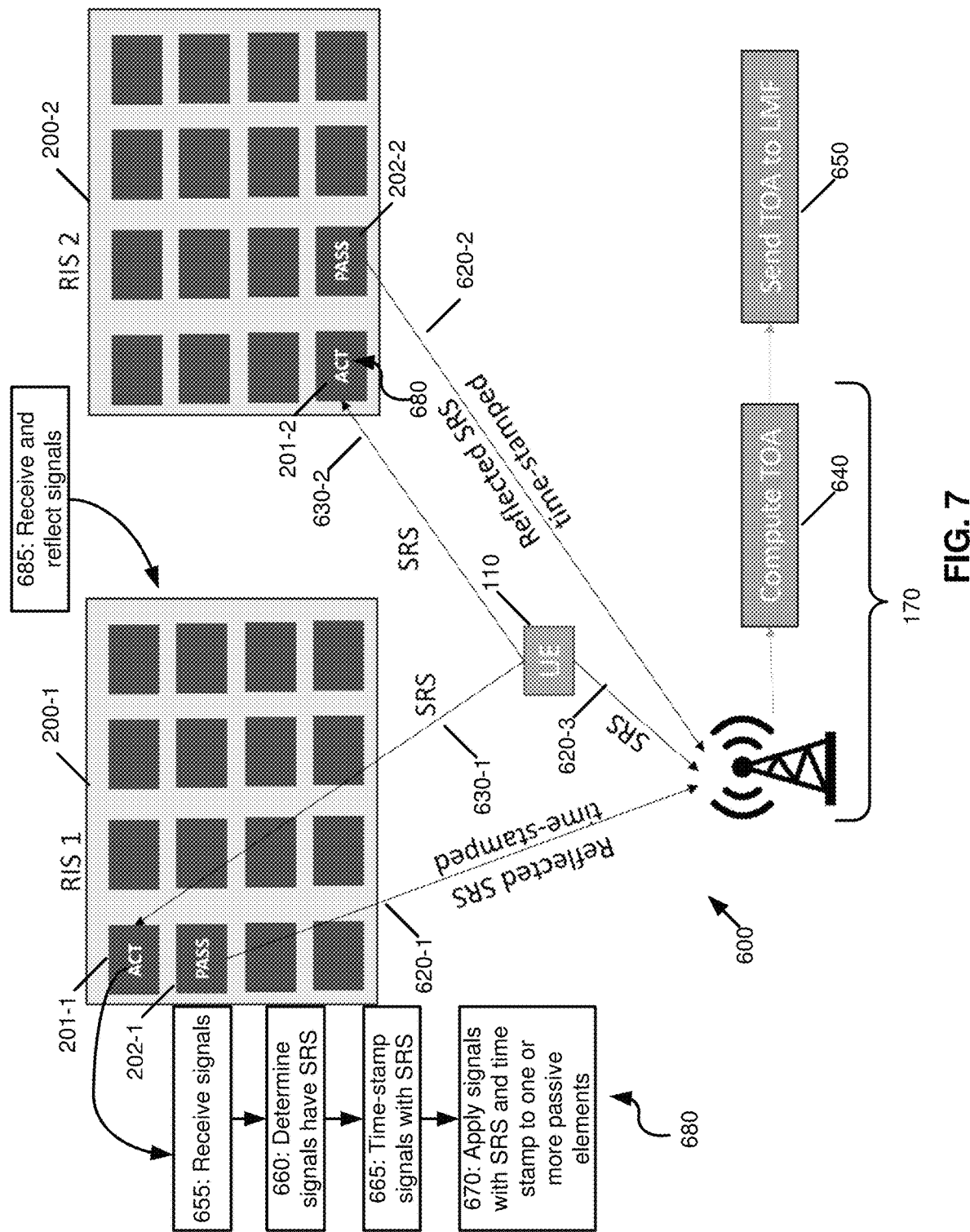
FIG. 7 illustrates a wireless system for RIS-based enhanced positioning using UL reference signal (such as SRS), in accordance with an example.

The method is used in a wireless system 600 for RIS-Based enhanced positioning, as shown in FIG. 7, which illustrates a wireless system for RIS-based enhanced positioning using UL reference signal (such as SRS), in accordance with an example. The wireless system 600 has a base station 170 able to communicate with a UE 110, and two RIS, RIS 1 200-1 and RIS 2 200-2. A UE connects to the wireless system 600 and sends a direct SRS signal 620-3 to the base station 170, and sends SRS signals 630-1 and 630-2 toward RIS 1 200-1 and RIS 2 200-2, respectively, which become two reflected SRS signals 620-1 and 620-2 to the base station 170. That is, the UE 110 broadcasts the SRS signal, and each of the gNB 170 and two RISs 200-1 and 200-2 receive it. Specifically, the UE's SRS signal 630-1 reaches the RIS 1 200-1 by the active element 201-1, which implements an assistance channel 40, and then forms a signal 620-1 with a reflected SRS from the RIS 1 200-1 to the base station 170 using one or more passive elements 202, of which element 202-1 is shown. It is possible the RIS might use all passive elements for reflection. Furthermore, the UE's SRS signal 630-2 reaches the RIS 2 200-2, which is received by the active element 201-2, which implements an assistance channel 40, and then forms a signal 620-2 with a reflected SRS from the RIS 2 200-2 to the base station 170 using one or more passive elements 202, of which element 202-2 is shown.

Consider a general example. Upon reception of SRS, the active elements 220 through RIS controller 240 will put the current time stamp on the signal to let a gNB (or UE, depending on implementation) know the exact time of arrival (TOA) of the SRS signal from the UE to RIS. Then the gNB will use this ToA stamp for positioning. It is further possible to consider some type of manipulation performed (e.g., subtraction of an amount time) to take into account the processing time between reception and when time-stamping is to be performed, which could make the time used for time-stamping more accurate.

In a specific example with respect to reflecting the SRS signal with a time stamp, the active element 201-1 performs a method 680 where the active element receives (block 655) the signal 630-1 having the SRS, and in block 660 determines the received signal 630-1 has SRS. It is noted that the RIS 200-1 could be configured by the RIS controller 240 so that reflection from the passive elements is configured so that reflection does not occur until signal(s) have been time-stamped. The active element 201-1 time-stamps the signal in block 665, and then applies the time-stamped signal with SRS to one or more passive elements 202, in this example passive element 202-1, which has the effect of reflecting the signal 630-1 as signal 620-1, which not only has the SRS but also a time stamp corresponding to the time at which the signal 630-1 was received. A similar method 680 would be performed in RIS 2 200-1 and active element 201-2.

In more detail, the UE 110 transmits SRS to the serving cell (base station 170) and the neighboring RIS 200 from neighboring gNBs located nearby. One can assume that one gNB serving area could have multiple RISs, e.g., for an indoor scenario so there could be 1-to-1 assignment between RIS and gNB. Regardless, one RIS could instead be assigned to multiple gNBs (e.g., at cell edge to improve coverage of both gNBs). One or more RIS UE assistance channels 40, implemented by active elements 201-1 and 201-2, receive the SRS from UE, puts a time stamp to improve the positioning performance (i.e., helps base station for TOA estimate from UE to RIS), amplifies and forwards the time-stamped SRS to the serving BS using RIS passive elements 202-1 and 202-2 via signals 620-1 and 620-2. Effectively, the RISs backscatter time-stamp information with the forwarded signal and it is assumed that the receiver (e.g., Rx 132 in FIG. 11B) in the gNB could decode both. Then, the network localizes the UE based on the round-trip signals, e.g., could be using the TOA approach, the angle-of-arrival (AOA) or angle-of-departure (AOD) approach, or the received-signal-strength (RSS) approach. This is performed in block 640, where the gNB computes TOA. Then, the TOA is sent by the base station 170 to the LMF for positioning, see block 650.

The main purpose of the UE-RIS control link 30 (see FIG. 4) is to provide a reachable link for a low-power device (which in certain cases cannot send a positioning reference signal to neighbor gNB) and locate the link with minimum overhead.

An alternative technique to using the time-stamping is to use just passive RIS (which is low cost, i.e., without active elements) that just forwards the incoming SRS to the gNB without UE-gNB coordination that might cause interference issues as well. See block 685. In this case, it is assumed that the gNB already knows the delay from RIS to gNB (assume this is T1), ToA of SRS at gNB (assume this is T2), then the gNB can estimate the ToA of SRS received at RIS using (T-ris=T2-T1). But this time might not be fully accurate, as the T1 could be smaller or larger than a known value, e.g., due to blockage or mobility in environment, or the like. So, it is difficult to estimate the delay for the signal propagated between RIS-gNB, and the time-stamp technique could provide additional benefit.

Figure 8:
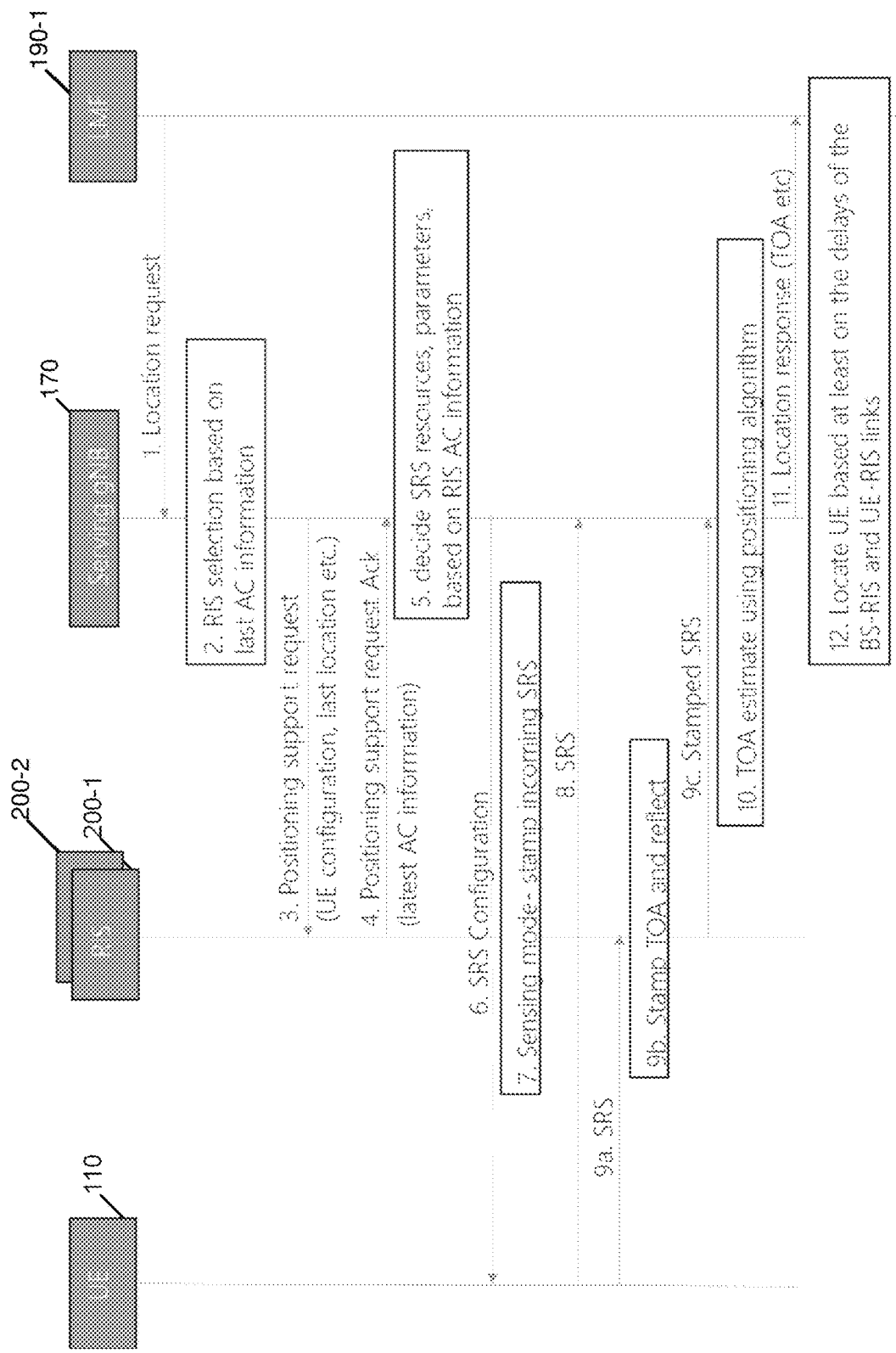
FIG. 8 illustrates a signaling flowchart for RIS-based enhanced positioning using UL-SRSs (uplink-sounding reference signals), in accordance with an example related to FIG. 7.

Referring to FIG. 8, this figure illustrates a signaling flowchart for RIS-based enhanced positioning using UL-SRSs (uplink-sounding reference signals), in accordance with an example related to FIG. 7.

At step 902, the LMF 190-1 sends a location request to the serving base station 170. The serving base station 170, at step 904, performs RIS selection based on the last known information of the neighbor RISs (in this example, RISs 200-1 and 200-2). The RIS(s) 200 with less load on the assistance channel 40 may be chosen. At step 906, the serving base station 170 sends a positioning support request to the neighbor RISs 200 that could include the last UE location and UE configuration to RIS, for the RIS that needs connection with the UE via the assistance channel 40. This enables the UE 110 to communicate with RIS on the assistance channel 40 without any configuration procedure between UE and RIS.

4. In case the RIS assistance channel 40 is not busy, e.g., based on the current assistance channel (AC) 40 information, such as scheduling information, the assistance channel 40 sends the positioning support request acknowledgment and provides the latest assistance channel 40 information to the gNB for its use. As described with reference to FIG. 5, one RIS could be used for multiple neighbor gNBs and have schedule(s) for each, so there is a possibility that assistance channel 40 is busy due to the tasks allocated by other gNBs.

In case the RIS 200 is busy (i.e., because of a high load due to requests from other UEs/gNBs), the RIS 200 may reject the positioning support request. In this case, the serving cell will choose another RIS. Note that the example in FIG. 8, by contrast, assumes the RIS 200 is not busy.

5. The serving base station 170 determines SRS resources, parameters, and periodicity based on the RIS assistance channel 40 availability information. In one example case, SRS periodicity could be chosen less frequently due to the less frequent availability of RIS assistance channel 40. That is, the RIS assistance channel 40 may be less frequently available (e.g., due to scheduling conflicts), and therefore less frequent SRS periodicity may be chosen (e.g., if the SRS periodicity ranges from 2 ms to 320 ms, periodicity of 320 ms may be selected as being less periodic or less frequent).

6. The serving base station provides SRS configuration to the UE (e.g., comb-size, repetition factor, periodicity, BW factors, or the like).

7. The RIS goes to sensing mode to put a time stamp on incoming signal from the UE and reflect towards the serving base station.

8. The UE sends SRS to the serving base station.

9a. The UE sends SRS to the nearby located RIS via assistance channel 40. In 9b, the RIS 200 implementing the assistance channel 40 puts a time stamp on the incoming signal ("stamp TOA") and reflects (9c) the time-stamped SRS towards the serving cell using its passive element(s) 202.

10. The serving cell 170 estimates the TOA(s) of the SRS received at the base station from both UE and RIS. Note that this estimation typically performs one timing estimate for each received SRS, such as the following: ToA1 (direct); ToA2 (signal received to gNB via RIS1); ToA 3 (signal received to gNB via RIS2); and the like.

a. It is assumed that RIS location information and delay of BS-RIS are known.

b. Using the time stamp of RIS, the base station 170 estimates the TOA of SRS at the RIS and performs positioning.

11. The serving base station 170 sends the location response to the LMF, i.e., the estimated TOA to the LMF 190-1.

12. The LMF 190-1 locates the UE based at least on the delays of the BS-RIS and UE-RIS links.

Figure 9:
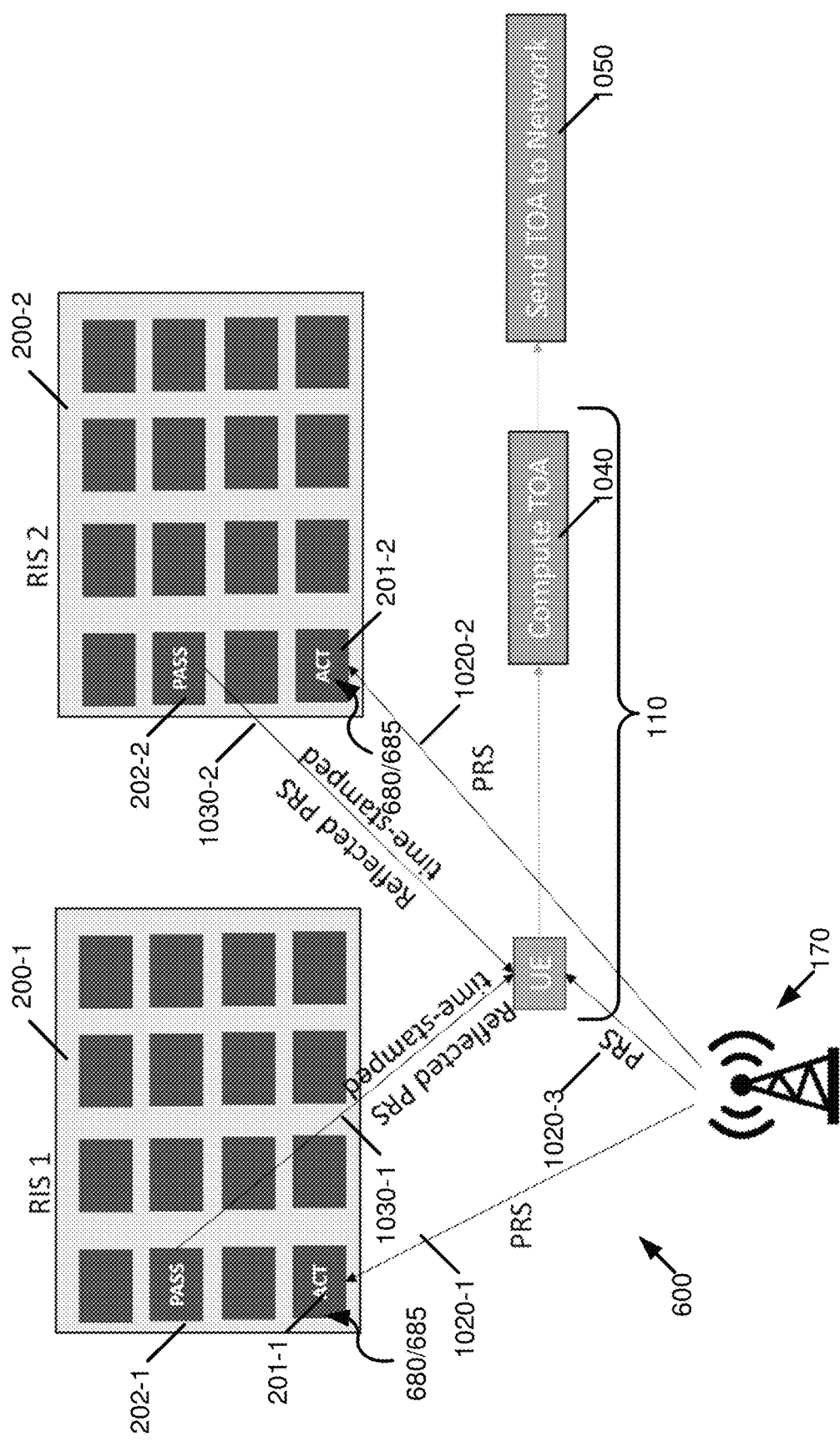
FIG. 9 illustrates a wireless system for RIS-based enhanced positioning using DL reference signals (such as downlink-positioning reference signals (DL-PRSs), synchronization signal block (SSB) signals, Channel Status Information (CSI) reference signals, and the like) in accordance with an example.

Similarly, the examples can be extended for the DL-PRS procedure. See the following example signaling sequence. FIG. 9 illustrates a wireless system for RIS-based enhanced positioning using DL reference signals (such as downlink-positioning reference signals (DL-PRSs), synchronization signal block (SSB) signals, Channel Status Information (CSI) reference signals, and the like) in accordance with an example.

In FIG. 9, the method is used in a wireless system 600 for RIS-Based enhanced positioning. As with FIG. 7, the wireless system 600 has a base station 170 able to communicate with a UE 110, and two RISs, RIS 1 200-1 and RIS 2 200-2. A UE connects to the wireless system 600 and its base station 170 sends a direct PRS signal 1020-3 to the UE 110, and two PRS signals 1020-1 and 1020-2 reach the RIS 1 200-2 and RIS 2 200-2, respectively. The PRS signal 1020-1 reaches the RIS 1 200-1, and is received by the active element 201-1, which implements an assistance channel 40 and performs a version of method 680 (or 685), and then forms a signal 1030-1 with a reflected PRS from the RIS 1 200-1 to the base station 170 using one or more passive elements 202, of which passive element 202-1 is shown. The gNB's PRS signal reaches the RIS 2 200-2, and is received by the active element 201-2, which implements an assistance channel 40 and performs a version of method 680 (or 685), and then forms a signal 1020-2 with a reflected PRS from the RIS 2 200-2 to the base station 170 using one or more passive elements 202, of which passive element 202-2 is shown. It should be noted that method 680 for FIG. 9 implementation would have block 660 determining the signals should had DL PRS (instead of SRS as shown in FIG. 7).

The UE localizes itself based on the round-trip signals, e.g., could be using the time-of-arrival (TOA) approach, the angle-of-arrival (AOA) or angle-of-departure (AOD) approach, or the received-signal-strength (RSS) approach. This is performed in block 1040, where the UE computes TOA. Then, the TOA is sent by the UE 110 to the network (e.g., and possibly subsequently to the LMF) for positioning, see block 1050.

Figure 10:
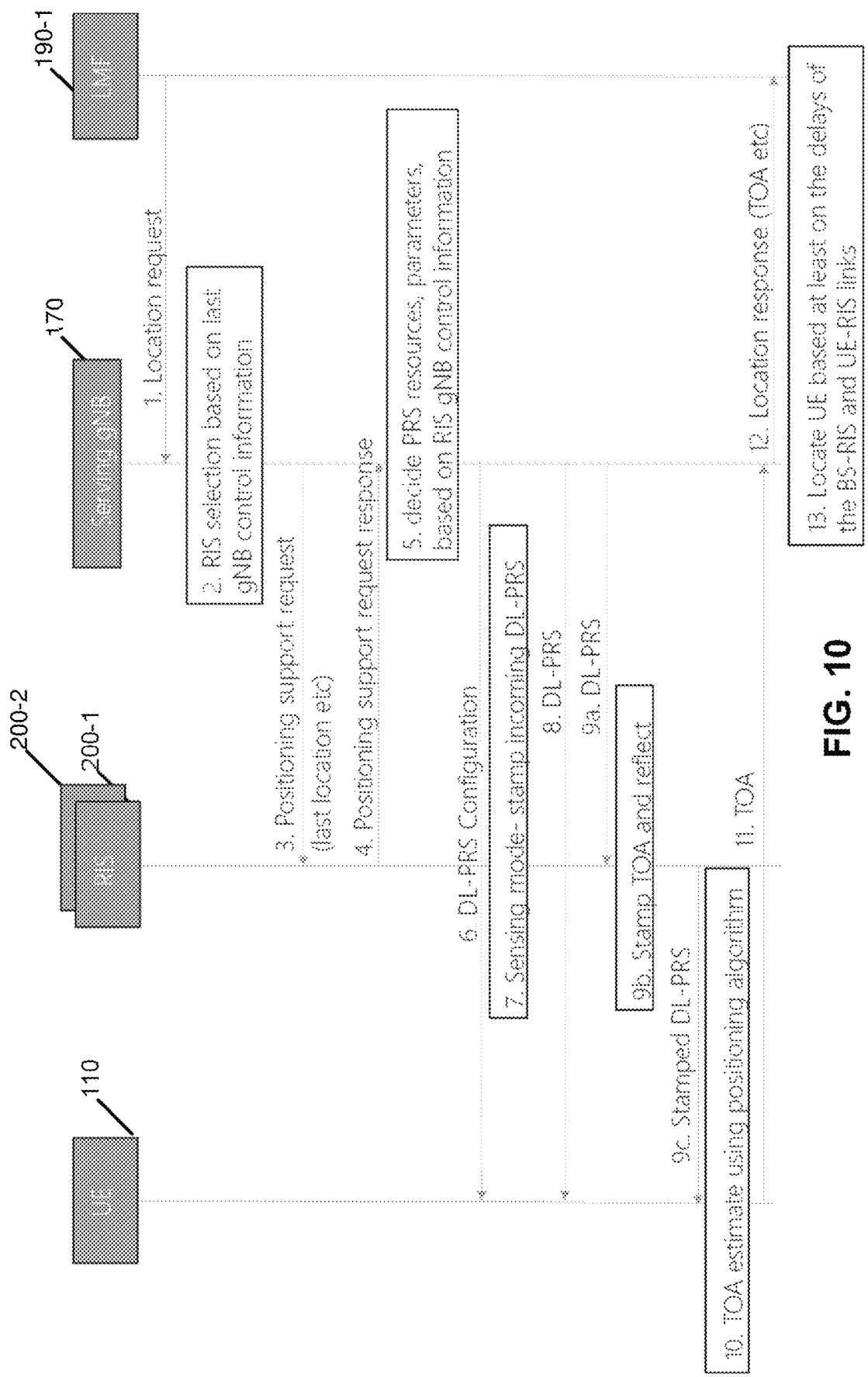
FIG. 10 illustrates a signaling flowchart for RIS-based enhanced positioning using DL-PRS, in accordance with an example related to FIG. 9.

Exemplary signaling is shown in FIG. 10, which illustrates a signaling flowchart for RIS-based enhanced positioning using DL-PRS, in accordance with an example related to FIG. 9.

1. The LMF 190-1 sends a location request to the serving base station 170.

2. The serving base station 170 performs RIS selection based on the last known gNB control channel information.

3. The serving base station 170 sends the positioning support request to the neighbor RISs 200 that could include the last UE location, or the like. For example, this could include phase configuration of the RIS elements, so that the incoming signal is reflected in the desired direction.

4. The base station control channel (e.g., control link 30) at the RIS 200 is used to send the positioning support request response (an acknowledgment in this example, e.g., based on availability of the RIS, which could be as simple as a Yes/No indication) and the RIS updates its availability information accordingly.

In case the RIS is busy (i.e., because of a high load due to other requests), the RIS 200 may reject the positioning support request. In this case, the serving base station 170 will choose another RIS.

5. The serving base station 170 decides DL-PRS resources, parameters, and periodicity based on the RIS availability information. In one example case, DL-PRS periodicity could be chosen to be less frequent due to the less frequent availability of RIS elements.

6. The serving base station 170 provides DL-PRS configuration to the UE 110 (e.g., periodicity, BW factors, or the like).

7. The RIS 200 goes to sensing mode to put a time stamp on the incoming signal (from the serving base station 170) and reflects towards the UE 110.

8. The serving base station 170 sends DL-PRS to the UE.

9a. The serving base station 170 sends DL-PRS to the nearby located RIS(s) 200. The RIS using the gNB control channel puts (9b) a time stamp on the incoming signal and reflects (9c) the time-stamped DL-PRS towards the UE using its passive elements.

10. The UE 110 estimates the TOA of the DL-PRS received from both gNB and RIS. Note that this estimation typically performs one timing estimate for each received DL-PRS, such as the following: ToA1 (direct); ToA2 (signal received toUE via RIS1); ToA 3 (signal received to UE via RIS2); and the like.

a. It is assumed that RIS location information and delay of BS-RIS are known to the UE (e.g., provided in the positioning configuration, step 6).

b. Using the time stamp of RIS, the UE estimates the TOA of DL-PRS at the RIS and UE.

11. The UE 110 sends an estimated TOA to the serving base station 170.

12. The serving cell sends the location response to the LMF 190-1, i.e., the estimated TOA to the LMF 190-1.

13. The LMF 190-1 locates the UE 110 based on the delay of BS-RIS and UE-RIS link.

Figure 11:
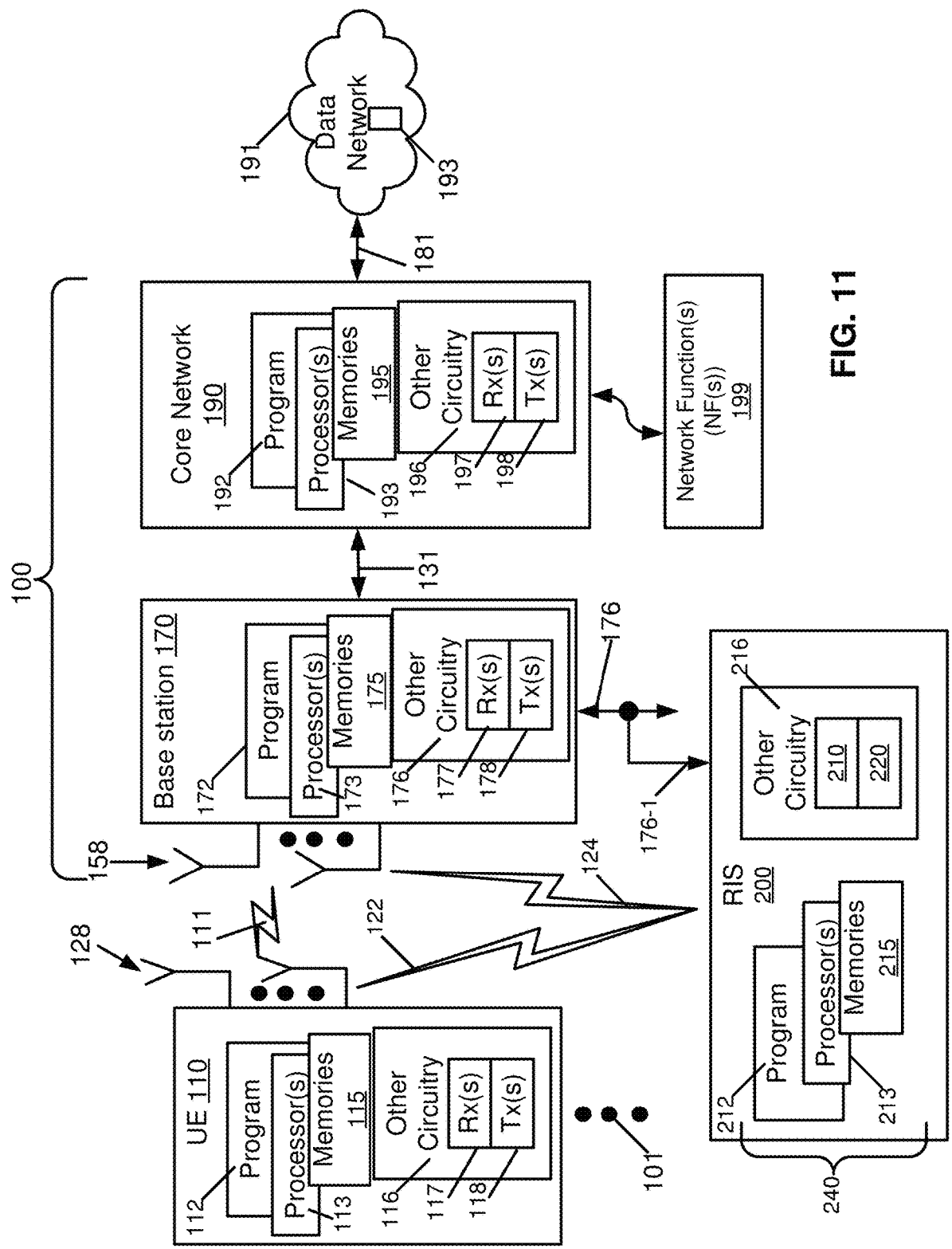
FIG. 11 is a block diagram of one possible and non-limiting exemplary system in which the exemplary embodiments may be practiced.

Turning to FIG. 11, this figure shows a block diagram of one possible and non-limiting example of a cellular network 100 that is connected to a user equipment (UE) 110. A number of nodes are shown in the cellular network of FIG. 11: a base station 170; a core network 190, and an RIS 200.

In FIG. 1, a user equipment (UE) 110, as one of the nodes, is in wireless communication via radio link 111 with the base station 170 of the cellular network 100. The UE 110 is illustrated with one or more antennas 128. The ellipses 101 indicate there could be multiple UEs 110 in wireless communication via radio links with the base station 170. The UE 110 includes one or more processors 113, one or more memories 115, and other circuitry 116. The other circuitry 116 includes one or more receivers (Rx(s)) 117 and one or more transmitters (Tx(s)) 118. A program 112 is used to cause the UE 110 to perform the operations described herein. For a UE 110, the other circuitry 116 could include circuitry such as for user interface elements like a display.

The base station 170, as another of the nodes of the cellular network 100, provides the UE 110 access to cellular network 100 and to the data network 191 via the core network 190 (e.g., via a user plane function (UPF) of the core network 190). The base station 170 is illustrated as having one or more antennas 158. In general, the base station 170 is referred to as RAN node 170 herein. An example of a RAN node 170 is a gNB. There are, however, many other examples of RAN nodes including an eNB or TRP. The base station 170 includes one or more processors 173, one or more memories 175, and other circuitry 176. The other circuitry 176 includes one or more receivers (Rx(s)) 177 and one or more transmitters (Tx(s)) 178. A program 172 is used to cause the base station 170 to perform the operations described herein.

Two or more base stations 170 communicate using, e.g., link(s) 176. The link(s) 176 may be wired or wireless or both and may implement, e.g., an Xn interface for 5G, an X2 interface for LTE, or other suitable interface for other standards.

The cellular network 100 may include a core network 190, as a third illustrated node or nodes, that may include core network functionality, and which provide connectivity via a link or links 181 with a data network 191, such as a telephone network and/or a data communications network (e.g., the Internet). The core network 190 includes one or more processors 193, one or more memories 195, and other circuitry 196. The other circuitry 196 includes one or more receivers (Rx(s)) 197 and one or more transmitters (Tx(s)) 198. A program 192 is used to cause the core network 190 to perform the operations described herein.

The core network 190 could be a 5GC (5G core network). The core network 190 can implement multiple network functions (NF(s)) 199. A 5G core network only requires hardware such as memory and processors and a virtualization layer. It could be a single standalone computing system, a distributed computing system, or a cloud computing system. The NFs 199 of the core network could be containers or virtual machines running on the hardware of the computing system making up the core network 190. The NFs 199 include the LMF 190-1

Core network functionality for 5G may include access and mobility management functionality that is provided by a network function 199 such as an access and mobility management function (AMF(s)), session management functionality that is provided by a network function such as a session management function (SMF). Core network functionality for access and mobility management in an LTE network may be provided by an MME (Mobility Management Entity) and/or SGW (Serving Gateway) functionality, which routes data to the data network. These are merely exemplary core network functionality that may be provided by the core network 190, and note that both 5G and LTE core network functionality might be provided by the core network 190. The RAN node 170 is coupled via a backhaul link 131 to the core network 190. The RAN node 170 and the core network 190 may include an NG interface for 5G, or an SI interface for LTE, or other suitable interface for other radio access technologies for communicating via the backhaul link 131.

A single RIS 200 is illustrated. There are two wireless links 122, between the RIS 200 and the UE 110, and 124, between the RIS 200 and the base station 170. A radio frequency (RF) signal on link 124 from the base station 170 could be reflected by the RIS 200 toward the UE 110 via an RF signal on link 122. Similarly, an RF signal on link 122 from the UE could be reflected by the RIS 200 toward the base station 170 via an RF signal on link 124.

The RIS 200 includes one or more processors 293, one or more memories 2155, and other circuitry 216. The other circuitry 216 includes the passive elements 210 and the active elements 220. A program 212 is used to cause the RIS 200 to perform the operations described herein. The RIS controller 240 is assumed to comprise the program 212, the processor(s) 213, and the memories 215.

In the data network 191, there is a computer-readable medium 193. The computer-readable medium 193 contains instructions that, when downloaded and installed into the memories 115, 175, 195, or 215 of the corresponding UE 110, base station 170, and/or core network element(s) 190, and executed by processor(s) 113, 172, or 192 cause the respective device to perform corresponding actions described herein. The computer-readable medium 193 may be implemented in other forms, such as via a compact disc or memory stick. It is further noted that the programming in computer-readable medium 193 for each of the UE 110, base station 170, core network 190, and RIS 200 would be different.

The programs 112, 172, 192, and 212 contain instructions stored by corresponding one or more memories 115, 175, 195, or 215. These instructions, when executed by the corresponding one or more processors 113, 173, 193, and 213, cause the corresponding apparatus 110, 170, 190, and 200 to perform the operations described herein. The programs 112, 172, 192, and 212 may alternatively or additionally be implemented in hardware, such as in other circuitry 116, 176, 196, or 216, and/or as part of the processor(s) 113, 173, 193, and 216. The computer readable memories 115, 175, 195, and 215 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 115, 175, 195, and 215 may be means for performing storage functions. The processors 113, 173, 193, and 213 may be of any type suitable to the local technical environment, and may include one or more of general-purpose computers, special purpose computers, microprocessors, digital signal processors (DSPs) and processors based on a multi-core processor architecture, as non-limiting examples. The processors 113, 173, 193, and 213 may be means for performing functions, such as those described herein.

The receivers 117, 177, and 197, and the transmitters 118, 178, 198 may implement wired or wireless interfaces. Sets of receivers and transmitters may be grouped together as transceivers for different technologies, such as Bluetooth (a short-range wireless technology standard), Wi-Fi (internet access from a wireless-capable device), ethernet or other wired or optical networking, or the like.

Without in any way limiting the scope, interpretation, or application of the claims appearing below, a technical effect and/or advantage of one or more of the example embodiments disclosed herein is RIS is low cost in comparison to BS and thus can be deployed with higher density. Another technical effect and/or advantage of one or more of the example embodiments disclosed herein is the examples provide reachability for low-power IoT devices by using a dedicated control link (UE assistance channel: assistance channel 40) to improve positioning performance. Another technical effect and/or advantage of one or more of the example embodiments disclosed herein is the proposed enhanced positioning procedure using RIS is a promising solution for future networks.

The following are additional examples.

Example 1. A method, comprising: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

Example 2. The method according to example 1, wherein performing the process comprises sending a positioning support request to the selected one or more reconfigurable intelligent surfaces requesting at least user equipment configuration and a last location of the user equipment, and receiving an acknowledgement of the positioning support request, the acknowledgement comprising information comprising user equipment configuration and a last location of the user equipment.

Example 3. The method according to example 2, further comprising determining by the base station at least resources and parameters for the reference signal configuration based on the information in the acknowledgement, and the sending uses the determined resources and parameters for the reference signal configuration.

Example 4. The method according to any one of examples 1 to 3, wherein the reference signal configuration comprises configuration using sounding reference signals, and the method comprises: receiving sounding reference signals from the user equipment; receiving signals comprising sounding reference signals that have been reflected from the one or more reconfigurable intelligent surfaces, and corresponding time stamps for the sounding reference signals, the time stamps indicating when the sounding reference signals were received by corresponding one or more reconfigurable intelligent surfaces; performing timing estimates based on the received sounding reference signals and the received signals including the time stamps; and sending indication of the timing estimates toward a location management element.

Example 5. The method according to any one of examples 1 to 3, wherein the reference signal configuration comprises configuration using sounding reference signals, and the method comprises: receiving sounding reference signals from the user equipment; receiving signals comprising sounding reference signals that have been reflected from the one or more reconfigurable intelligent surfaces; performing timing estimates based on the received sounding reference signals; and sending indication of the timing estimates toward a location management element.

Example 6. The method according to any one of examples 1 to 3, wherein the reference signal configuration comprises configuration using downlink positioning reference signals, and the method comprises: sending positioning reference signals toward the user equipment and the one or more reconfigurable intelligent surfaces; receiving a timing estimate based on the sent positioning reference signals; and sending indication of the timing estimate toward a location management element.

Example 7. The method according to any one of examples 4 to 6, wherein the timing estimates use one or more of a time-of-arrival (TOA) approach, an angle-of-arrival (AOA) or angle-of-departure (AOD) approach, or a received-signal-strength (RSS) approach.

Example 8. A method, comprising: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

Example 9. The method according to example 8, further comprising receiving corresponding time stamps for the reference signals, the time stamps indicating when the reference signals were received by corresponding one or more reconfigurable intelligent surfaces, and the performing the timing estimates comprises performing by the user equipment the timing estimates based on the received reference signals and the received signals including the time stamps.

Example 10. The method according to either of examples 8 or 9, wherein the reference signals are downlink positioning reference signals.

Example 11. The method according to one of examples 8 to 10, wherein performing by the user equipment timing estimates comprises performing the following time estimates: a first timing estimate based on a direct signal from the base station to the user equipment; and a second timing estimate based on a signal from the base station and reflected off a first of the one or more reconfigurable intelligent surfaces to the user equipment.

Example 12. The method according to example 11, wherein performing by the user equipment timing estimates comprises performing the following time estimate: a third timing estimate based on a signal from the base station and reflected off a second of the one or more reconfigurable intelligent surfaces to the user equipment.

Example 13. The method according to any one of examples 8 to 12, wherein the timing estimates use one or more of a time-of-arrival (TOA) approach, an angle-of-arrival (AOA) or angle-of-departure (AOD) approach, or a received-signal-strength (RSS) approach.

Example 14. A method, comprising: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

Example 15. The method according to example 14, further comprising, prior to receiving the signals, receiving, by the reconfigurable intelligent surface form a base station, a positioning support request requesting at least user equipment configuration for the user equipment and a last location of the user equipment, and sending, by the reconfigurable intelligent surface to the base station, an acknowledgement of the positioning support request, the acknowledgement comprising information comprising user equipment configuration and a last location of the user equipment.

Example 16. The method according to any one of examples 14 or 15, wherein the receiving and time stamping are performed by one or more active elements in the reconfigurable intelligent surface, and the reflecting is performed using signals from the one or more active elements with the time stamping being routed to one more passive elements in the reconfigurable intelligent surface that perform the reflecting the signals.

Example 17. The method according to any one of examples 14 to 16, further comprising determining signals received by the reconfigurable intelligent surface include the reference signals, and performing the time stamping of the signals comprising the reference signals in response to a determination the signals received by the reconfigurable intelligent surface include the reference signals.

Example 18. The method according to any one of examples 14 to 17, wherein the time stamping is performed by taking into account processing time between reception of the signals comprising the reference signals and when time-stamping is to be performed.

Example 19. The method according to any one of examples 14 to 18, wherein reflection from passive elements in the reconfigurable intelligent surface is configured so that reflection does not occur at least until the signals with the reference signals have been time-stamped.

Example 20. The method according to any one of examples 14 to 19, wherein the reference signals comprise one of sounding reference signals or downlink positioning reference signals.

Example 21. A computer program, comprising instructions for performing the methods of any of examples 1 to 20, when the computer program is run on an apparatus.

Example 22. The computer program according to example 21, wherein the computer program is a computer program product comprising a computer-readable medium bearing instructions embodied therein for use with the apparatus.

Example 23. The computer program according to example 21, wherein the computer program is directly loadable into an internal memory of the apparatus.

Example 24. An apparatus, comprising means for performing: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

Example 25. The apparatus according to example 24, wherein performing the process comprises sending a positioning support request to the selected one or more reconfigurable intelligent surfaces requesting at least user equipment configuration and a last location of the user equipment, and receiving an acknowledgement of the positioning support request, the acknowledgement comprising information comprising user equipment configuration and a last location of the user equipment.

Example 26. The apparatus according to example 25, wherein the means are further configured for performing: determining by the base station at least resources and parameters for the reference signal configuration based on the information in the acknowledgement, and the sending uses the determined resources and parameters for the reference signal configuration.

Example 27. The apparatus according to any one of examples 24 to 26, wherein the reference signal configuration comprises configuration using sounding reference signals, and the apparatus comprises: receiving sounding reference signals from the user equipment; receiving signals comprising sounding reference signals that have been reflected from the one or more reconfigurable intelligent surfaces, and corresponding time stamps for the sounding reference signals, the time stamps indicating when the sounding reference signals were received by corresponding one or more reconfigurable intelligent surfaces; performing timing estimates based on the received sounding reference signals and the received signals including the time stamps; and sending indication of the timing estimates toward a location management element.

Example 28. The apparatus according to any one of examples 24 to 26, wherein the reference signal configuration comprises configuration using sounding reference signals, and the apparatus comprises: receiving sounding reference signals from the user equipment; receiving signals comprising sounding reference signals that have been reflected from the one or more reconfigurable intelligent surfaces; performing timing estimates based on the received sounding reference signals; and sending indication of the timing estimates toward a location management element.

Example 29. The apparatus according to any one of examples 24 to 26, wherein the reference signal configuration comprises configuration using downlink positioning reference signals, and the apparatus comprises: sending positioning reference signals toward the user equipment and the one or more reconfigurable intelligent surfaces; receiving a timing estimate based on the sent positioning reference signals; and sending indication of the timing estimate toward a location management element.

Example 30. The apparatus according to any one of examples 27 to 29, wherein the timing estimates use one or more of a time-of-arrival (TOA) approach, an angle-of-arrival (AOA) or angle-of-departure (AOD) approach, or a received-signal-strength (RSS) approach.

Example 31. An apparatus, comprising means for performing: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

Example 32. The apparatus according to example 31, wherein the means are further configured for performing: receiving corresponding time stamps for the reference signals, the time stamps indicating when the reference signals were received by corresponding one or more reconfigurable intelligent surfaces, and the performing the timing estimates comprises performing by the user equipment the timing estimates based on the received reference signals and the received signals including the time stamps.

Example 33. The apparatus according to either of examples 31 or 32, wherein the reference signals are downlink positioning reference signals.

Example 34. The apparatus according to one of examples 31 to 33, wherein performing by the user equipment timing estimates comprises performing the following time estimates: a first timing estimate based on a direct signal from the base station to the user equipment; and a second timing estimate based on a signal from the base station and reflected off a first of the one or more reconfigurable intelligent surfaces to the user equipment.

Example 35. The apparatus according to example 34, wherein performing by the user equipment timing estimates comprises performing the following time estimate: a third timing estimate based on a signal from the base station and reflected off a second of the one or more reconfigurable intelligent surfaces to the user equipment.

Example 36. The apparatus according to any one of examples 31 to 35, wherein the timing estimates use one or more of a time-of-arrival (TOA) approach, an angle-of-arrival (AOA) or angle-of-departure (AOD) approach, or a received-signal-strength (RSS) approach.

Example 37. An apparatus, comprising means for performing: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

Example 38. The apparatus according to example 37, wherein the means are further configured for performing: prior to receiving the signals, receiving, by the reconfigurable intelligent surface form a base station, a positioning support request requesting at least user equipment configuration for the user equipment and a last location of the user equipment, and sending, by the reconfigurable intelligent surface to the base station, an acknowledgement of the positioning support request, the acknowledgement comprising information comprising user equipment configuration and a last location of the user equipment.

Example 39. The apparatus according to any one of examples 37 or 38, wherein the receiving and time stamping are performed by one or more active elements in the reconfigurable intelligent surface, and the reflecting is performed using signals from the one or more active elements with the time stamping being routed to one more passive elements in the reconfigurable intelligent surface that perform the reflecting the signals.

Example 40. The apparatus according to any one of examples 37 to 39, wherein the means are further configured for performing: determining signals received by the reconfigurable intelligent surface include the reference signals, and performing the time stamping of the signals comprising the reference signals in response to a determination the signals received by the reconfigurable intelligent surface include the reference signals.

Example 41. The apparatus according to any one of examples 37 to 40, wherein the time stamping is performed by taking into account processing time between reception of the signals comprising the reference signals and when time-stamping is to be performed.

Example 42. The apparatus according to any one of examples 37 to 41, wherein reflection from passive elements in the reconfigurable intelligent surface is configured so that reflection does not occur at least until the signals with the reference signals have been time-stamped.

Example 43. The apparatus according to any one of examples 37 to 42, wherein the reference signals comprise one of sounding reference signals or downlink positioning reference signals.

Example 44. The apparatus of any preceding apparatus example, wherein the means comprises: at least one processor; and at least one memory storing instructions that, when executed by at least one processor, cause the performance of the apparatus.

Example 45. An apparatus, comprising: one or more processors; and one or more memories storing instructions that, when executed by the one or more processors, cause the apparatus at least to perform: selecting, by a base station in response to a location request for a user equipment, one or more reconfigurable intelligent surfaces to use for positioning purposes for the user equipment; performing a process by the base station with the selected one or more reconfigurable intelligent surfaces to determine information used to configure the user equipment with reference signal configuration for using the selected one or more reconfigurable intelligent surfaces for the positioning purposes; and sending by the base station the reference signal configuration to the user equipment.

Example 46. The apparatus according to example 45, wherein performing the process comprises sending a positioning support request to the selected one or more reconfigurable intelligent surfaces requesting at least user equipment configuration and a last location of the user equipment, and receiving an acknowledgement of the positioning support request, the acknowledgement comprising information comprising user equipment configuration and a last location of the user equipment.

Example 47. The apparatus according to example 46, wherein the one or more memories further store instructions that, when executed by the one or more processors, cause the apparatus at least to perform: determining by the base station at least resources and parameters for the reference signal configuration based on the information in the acknowledgement, and the sending uses the determined resources and parameters for the reference signal configuration.

Example 48. The apparatus according to any one of examples 45 to 48, wherein the reference signal configuration comprises configuration using sounding reference signals, and the apparatus comprises: receiving sounding reference signals from the user equipment; receiving signals comprising sounding reference signals that have been reflected from the one or more reconfigurable intelligent surfaces, and corresponding time stamps for the sounding reference signals, the time stamps indicating when the sounding reference signals were received by corresponding one or more reconfigurable intelligent surfaces; performing timing estimates based on the received sounding reference signals and the received signals including the time stamps; and sending indication of the timing estimates toward a location management element.

Example 49. The apparatus according to any one of examples 45 to 48, wherein the reference signal configuration comprises configuration using sounding reference signals, and the apparatus comprises: receiving sounding reference signals from the user equipment; receiving signals comprising sounding reference signals that have been reflected from the one or more reconfigurable intelligent surfaces; performing timing estimates based on the received sounding reference signals; and sending indication of the timing estimates toward a location management element.

Example 50. The apparatus according to any one of examples 45 to 48, wherein the reference signal configuration comprises configuration using downlink positioning reference signals, and the apparatus comprises: sending positioning reference signals toward the user equipment and the one or more reconfigurable intelligent surfaces; receiving a timing estimate based on the sent positioning reference signals; and sending indication of the timing estimate toward a location management element.

Example 51. The apparatus according to any one of examples 48 to 50, wherein the timing estimates use one or more of a time-of-arrival (TOA) approach, an angle-of-arrival (AOA) or angle-of-departure (AOD) approach, or a received-signal-strength (RSS) approach.

Example 52. An apparatus, comprising: one or more processors; and one or more memories storing instructions that, when executed by the one or more processors, cause the apparatus at least to perform: receiving, by a user equipment from a base station, a reference signal configuration for using one or more reconfigurable intelligent surfaces for positioning purposes; receiving by the user equipment reference signals, based on the reference signal configuration, from the base station; receiving, by the user equipment, signals comprising reference signals that have been reflected from the one or more reconfigurable intelligent surfaces; performing by the user equipment timing estimates based on the received reference signals and the received signals reflected from the one or more reconfigurable intelligent surfaces; and sending by the user equipment indication of the timing estimates toward the base station.

Example 53. The apparatus according to example 52, wherein the one or more memories further store instructions that, when executed by the one or more processors, cause the apparatus at least to perform receiving corresponding time stamps for the reference signals, the time stamps indicating when the reference signals were received by corresponding one or more reconfigurable intelligent surfaces, and the performing the timing estimates comprises performing by the user equipment the timing estimates based on the received reference signals and the received signals including the time stamps.

Example 54. The apparatus according to either of examples 52 or 53, wherein the reference signals are downlink positioning reference signals.

Example 55. The apparatus according to one of examples 52 to 54, wherein performing by the user equipment timing estimates comprises performing the following time estimates: a first timing estimate based on a direct signal from the base station to the user equipment; and a second timing estimate based on a signal from the base station and reflected off a first of the one or more reconfigurable intelligent surfaces to the user equipment.

Example 56. The apparatus according to example 55, wherein performing by the user equipment timing estimates comprises performing the following time estimate: a third timing estimate based on a signal from the base station and reflected off a second of the one or more reconfigurable intelligent surfaces to the user equipment.

Example 57. The apparatus according to any one of examples 52 to 56, wherein the timing estimates use one or more of a time-of-arrival (TOA) approach, an angle-of-arrival (AOA) or angle-of-departure (AOD) approach, or a received-signal-strength (RSS) approach.

Example 58. An apparatus, comprising: one or more processors; and one or more memories storing instructions that, when executed by the one or more processors, cause the apparatus at least to perform: receiving, at a reconfigurable intelligent surface, signals comprising reference signals to be used for positioning purposes for a user equipment; time stamping by the reconfigurable intelligent surface the signals comprising the reference signals; and reflecting by the reconfigurable intelligent surface signals comprising the reference signals and corresponding time stamps.

Example 59. The apparatus according to example 58, wherein the one or more memories further store instructions that, when executed by the one or more processors, cause the apparatus at least to perform: prior to receiving the signals, receiving, by the reconfigurable intelligent surface form a base station, a positioning support request requesting at least user equipment configuration for the user equipment and a last location of the user equipment, and sending, by the reconfigurable intelligent surface to the base station, an acknowledgement of the positioning support request, the acknowledgement comprising information comprising user equipment configuration and a last location of the user equipment.

Example 60. The apparatus according to any one of examples 58 or 59, wherein the receiving and time stamping are performed by one or more active elements in the reconfigurable intelligent surface, and the reflecting is performed using signals from the one or more active elements with the time stamping being routed to one more passive elements in the reconfigurable intelligent surface that perform the reflecting the signals.

Example 61. The apparatus according to any one of examples 58 to 60, wherein the one or more memories further store instructions that, when executed by the one or more processors, cause the apparatus at least to perform: determining signals received by the reconfigurable intelligent surface include the reference signals, and performing the time stamping of the signals comprising the reference signals in response to a determination the signals received by the reconfigurable intelligent surface include the reference signals.

Example 62. The apparatus according to any one of examples 58 to 61, wherein the time stamping is performed by taking into account processing time between reception of the signals comprising the reference signals and when time-stamping is to be performed.

Example 63. The apparatus according to any one of examples 58 to 62, wherein reflection from passive elements in the reconfigurable intelligent surface is configured so that reflection does not occur at least until the signals with the reference signals have been time-stamped.

Example 64. The apparatus according to any one of examples 58 to 63, wherein the reference signals comprise one of sounding reference signals or downlink positioning reference signals.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 11. A computer-readable medium may comprise a computer-readable storage medium (e.g., memories 115, 175, 195, 215 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus in a base station, the apparatus comprising:
a receiver and a transmitter in communication with at least one processor; and at least one memory storing a program including instructions that, when executed by the at least one processor, cause the apparatus at least to:
select, in response to a location request for a user equipment, one or more reconfigurable intelligent surfaces to use for positioning of the user equipment;
perform a process with the selected one or more reconfigurable intelligent surfaces to determine information used to configure the user equipment with reference signal configuration for using the selected one or more reconfigurable intelligent surfaces for the positioning; and
send the reference signal configuration to the user equipment, the reference signal configuration comprising configuration using sounding reference signals;
receive sounding reference signals from the user equipment;
receive signals comprising sounding reference signals that have been reflected from the one or more reconfigurable intelligent surfaces, and corresponding time stamps for the sounding reference signals, the time stamps indicating when the sounding reference signals were received by corresponding one or more reconfigurable intelligent surfaces;
perform timing estimates based on the received sounding reference signals and the received signals including the time stamps.

2. The apparatus according to claim 1, wherein:
to perform the process comprises sending a positioning support request to the selected one or more reconfigurable intelligent surfaces requesting at least user equipment configuration and a last location of the user equipment, and receiving an acknowledgement of the positioning support request, the acknowledgement comprising information comprising user equipment configuration and a last location of the user equipment; and
the instructions, when executed by the at least one processor, cause the apparatus at least to: determine by the base station at least resources and parameters for the reference signal configuration based on the information in the acknowledgement, and the sending uses the determined resources and parameters for the reference signal configuration.

3. The apparatus according to claim 1, wherein the instructions cause the apparatus at least to: send indication of the timing estimates toward a location management element.

4. The apparatus according to claim 1, wherein the reference signal configuration comprises configuration using sounding reference signals, and wherein the instructions cause the apparatus at least to: send indication of the timing estimates toward a location management element.

5. The apparatus according to claim 1, wherein the reference signal configuration comprises configuration using downlink positioning reference signals, and wherein the instructions, when executed by the at least one processor, cause the apparatus at least to:
- send positioning reference signals toward the user equipment and the one or more reconfigurable intelligent surfaces;
- receive a timing estimate based on the sent positioning reference signals; and
- send indication of the timing estimate toward a location management element.

6. An apparatus in a user equipment, the apparatus comprising:
- a receiver and a transmitter in communication with at least one processor; and at least one memory storing instructions that, when executed by the at least one processor, cause the apparatus at least to:
  - receive, from a base station, a reference signal configuration for using one or more reconfigurable intelligent surfaces for positioning of the user equipment;
  - receive reference signals, based on the reference signal configuration, from the base station;
  - receive corresponding time stamps for the reference signals, the time stamps indicating when the reference signals were received by corresponding one or more reconfigurable intelligent surfaces;
  - receive signals comprising reference signals that have been reflected from the one or more reconfigurable intelligent surfaces;
  - perform by the user equipment timing estimates based on the received reference signals, the received signal including the time stamps, and the received signals reflected from the one or more reconfigurable intelligent surfaces; and
  - send indication of the timing estimates toward the base station.

7. The apparatus according to claim 6, wherein to perform by the user equipment timing estimates comprises performing the following time estimates: a first timing estimate based on a direct signal from the base station to the user equipment; and a second timing estimate based on a signal from the base station and reflected off a first of the one or more reconfigurable intelligent surfaces to the user equipment.

8. A reconfigurable intelligent surface comprising:
- one or more active elements and one or more passive elements, the elements configured to
  - cause the reconfigurable intelligent surface at least to:
    - receive, from a base station, a positioning support request requesting at least user equipment configuration for a user equipment and a last location of the user equipment, and send, to the base station, an acknowledgement of the positioning support request, the acknowledgement comprising information comprising user equipment configuration and a last location of the user equipment;
    - receive signals comprising reference signals to be used for positioning of the user equipment;
    - time stamp the signals comprising the reference signals; and
    - reflect signals comprising the reference signals and corresponding time stamps.

9. The reconfigurable intelligent surface according to claim 8, wherein the receiving and time stamping are performed by the one or more active elements, and the reflecting is performed by the one or more passive elements using signals from the one or more active elements with the time stamping routed to the one or more passive elements.

10. The reconfigurable intelligent surface according to claim 8, wherein the elements cause the reconfigurable intelligent surface at least to: determine signals received by the reconfigurable intelligent surface include the reference signals, and perform the time stamping of the signals comprising the reference signals in response to a determination of the signals received by the reconfigurable intelligent surface include the reference signals.

11. The reconfigurable intelligent surface according to claim 8, wherein the time stamping is performed by taking into account processing time between reception of the signals comprising the reference signals and when time-stamping is to be performed.

12. The reconfigurable intelligent surface according to claim 8, wherein reflection from passive elements in the reconfigurable intelligent surface is configured so that reflection does not occur at least until the signals with the reference signals have been time-stamped.

* * * * *